(12) United States Patent
Leemhuis et al.

(10) Patent No.: US 9,829,855 B2
(45) Date of Patent: Nov. 28, 2017

(54) DRIVE COUPLER

(71) Applicant: Lexmark International, Inc., Lexington, KY (US)

(72) Inventors: Michael Craig Leemhuis, Nicholasville, KY (US); Harald Portig, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 801 days.

(21) Appl. No.: 14/285,004

(22) Filed: May 22, 2014

(65) Prior Publication Data

US 2015/0338825 A1  Nov. 26, 2015

(51) Int. Cl.
  *G03G 15/08* (2006.01)
  *G03G 21/18* (2006.01)
  *F16D 1/06* (2006.01)
  *G03G 21/16* (2006.01)

(52) U.S. Cl.
  CPC .......... *G03G 21/1803* (2013.01); *F16D 1/06* (2013.01); *G03G 15/0865* (2013.01); *G03G 21/1647* (2013.01); *G03G 2221/1657* (2013.01); *Y10T 403/7005* (2015.01)

(58) Field of Classification Search
  CPC ........... G03G 21/1803; G03G 15/0865; G03G 21/1647; G03G 2221/1657; F16D 1/06; Y10T 403/7005
  See application file for complete search history.

(56) References Cited

U.S. PATENT DOCUMENTS

| 5,828,935 A | 10/1998 | Tatsumi et al. |
| 5,903,803 A | 5/1999 | Kawai et al. |
| 5,926,673 A | 7/1999 | Foster et al. |
| 6,076,419 A | 6/2000 | Mlejnek et al. |
| 6,128,454 A | 10/2000 | Kawai et al. |

(Continued)

FOREIGN PATENT DOCUMENTS

JP   2007147881 A  *  6/2007  ......... G03G 15/0806

OTHER PUBLICATIONS

English machine translation of Igarashi (JP 2007147881 A); "Developing Cartridge and Image Forming Apparatus"; by Igarashi, Hiroshi; published Jun. 14, 2007.*

(Continued)

*Primary Examiner* — David M Gray
*Assistant Examiner* — Geoffrey T Evans
(74) *Attorney, Agent, or Firm* — Justin M. Tromp (57) ABSTRACT

A replaceable unit for an image forming device according to one example embodiment includes a housing having a reservoir for storing toner. The replaceable unit includes a rotatable drive coupler and a rotatable shaft that has a cross pin on an axial end of the shaft, generally orthogonal to the shaft. At least a portion of the drive coupler is exposed on an exterior of the housing and unobstructed to receive rotational force when the replaceable unit is installed in the image forming device. A pocket is formed in a first axial side of the drive coupler. The axial end of the shaft and the cross pin are removably positioned in the pocket such that upon rotating the drive coupler in an operative direction rotational force is transferred from surfaces of the drive coupler forming the pocket to the cross pin causing the shaft to rotate with the drive coupler.

11 Claims, 9 Drawing Sheets

(56) References Cited

U.S. PATENT DOCUMENTS

| | | | |
|---|---|---|---|
| 6,397,029 B1 | 5/2002 | Portig | |
| 6,473,580 B1 * | 10/2002 | Inomata | F16D 1/112 |
| | | | 399/111 |
| 6,490,426 B1 * | 12/2002 | Zaman | F16D 1/10 |
| | | | 399/117 |
| 7,043,180 B2 | 5/2006 | Askren et al. | |
| 7,130,562 B2 | 10/2006 | Foster et al. | |
| 7,236,722 B2 | 6/2007 | Portig | |
| 7,623,811 B2 * | 11/2009 | Sato | F16D 3/04 |
| | | | 399/117 |
| 7,817,938 B2 * | 10/2010 | Igarashi | G03G 15/0806 |
| | | | 399/119 |
| 7,885,575 B2 * | 2/2011 | Batori | G03G 15/757 |
| | | | 399/111 |
| 8,041,262 B2 | 10/2011 | Carter et al. | |
| 8,064,800 B2 | 11/2011 | Carter et al. | |
| 8,257,185 B2 | 9/2012 | Carter et al. | |
| 8,316,733 B2 | 11/2012 | Malone et al. | |
| 8,731,438 B2 * | 5/2014 | Okabe | G03G 21/186 |
| | | | 399/167 |
| 8,774,685 B1 * | 7/2014 | Leemhuis | G03G 15/0865 |
| | | | 399/106 |
| 9,098,055 B2 * | 8/2015 | Maul | G03G 21/1647 |
| 9,213,303 B2 * | 12/2015 | Maul | G03G 21/1647 |
| 9,316,988 B2 * | 4/2016 | Hayashi | G03G 15/757 |
| 2004/0184834 A1 | 9/2004 | Blaine et al. | |
| 2005/0025528 A1 | 2/2005 | Nagai et al. | |
| 2005/0047818 A1 | 3/2005 | Yamada et al. | |
| 2008/0260428 A1 * | 10/2008 | Ueno | G03G 15/757 |
| | | | 399/167 |

OTHER PUBLICATIONS

International Search Report and Written Opinion dated Aug. 18, 2015 for PCT Application No. PCT/US15/31298.

Attached Information Disclosure Statement containing drawings of a photoconductive drum compatible with the Lexmark International, Inc. CS310, CS410, CS510, CX310, CX410, CX510 laser printer.

* cited by examiner

DRIVE COUPLER

CROSS REFERENCES TO RELATED APPLICATIONS

None.

BACKGROUND

1. Field of the Disclosure

The present disclosure relates to drive couplers and gears.

2. Description of the Related Art

Image forming devices such as electrophotographic printers, copiers and multifunction devices commonly include one or more replaceable units that have a shorter lifespan than the image forming device does. As a result, the replaceable unit must be replaced by the user from time to time in order to continue operating the image forming device. For example, an electrophotographic image forming device's toner supply is typically stored in one or more replaceable units. In some devices, imaging components having a longer life are separated from those having a shorter life in separate replaceable units. In this configuration, relatively longer life components such as a photoconductive drum and a developer or magnetic roll that conveys toner to the photoconductive drum may be positioned in one or more replaceable units referred to as imaging units. The image forming device's toner supply, which is consumed relatively quickly in comparison with the components housed in the imaging unit(s), may be provided in a reservoir in a separate replaceable unit in the form of a toner cartridge or bottle that supplies toner to one or more of the imaging unit(s). Other components of the electrophotographic image forming device such as a fuser or a waste toner container may also be replaceable. These replaceable units require periodic replacement by the user such as when the toner cartridge runs out of usable toner, when a replaceable unit's components reach the end of their life due to wear, when a waste toner reservoir fills with waste toner, etc.

Many replaceable units include one or more drive couplers or gears that mate with and receive rotational force from a corresponding coupler or gear in the image forming device when the replaceable unit is installed in the image forming device. The drive coupler or gear of the replaceable unit transfers the rotational force, directly or through a drive train, to rotating components on the replaceable unit. Drive couplers and gears of replaceable units often receive high torque loads and therefore must be strong enough to handle such loads over the life of the replaceable unit. Each drive coupler and gear must also be securely mounted to the replaceable unit and securely connected to the rotating components to ensure that torque is transferred through the replaceable unit properly. Space constraints in the image forming device limit the overall size of the drive couplers and gears of replaceable units in order to meet customer demand for compact image forming devices. Cost and ease of manufacture are also important factors in the design of these drive couplers and gears.

SUMMARY

A replaceable unit for an image forming device according to one example embodiment includes a housing having a reservoir for storing toner. The replaceable unit includes a rotatable drive coupler and a rotatable shaft that has a cross pin on an axial end of the shaft. The cross pin is positioned generally orthogonal to the shaft. At least a portion of the drive coupler is exposed on an exterior of the housing and unobstructed to receive rotational force when the replaceable unit is installed in the image forming device. A pocket is formed in a first axial side of the drive coupler. The axial end of the shaft and the cross pin are removably positioned in the pocket such that upon rotating the drive coupler in an operative direction rotational force is transferred from surfaces of the drive coupler forming the pocket to the cross pin causing the shaft to rotate with the drive coupler.

A replaceable unit for an image forming device according to another example embodiment includes a housing having a reservoir for storing toner. The replaceable unit includes a rotatable drive coupler and a rotatable shaft that has a cross pin on an axial end of the shaft. The cross pin is positioned generally orthogonal to the shaft. The drive coupler has a plurality of lugs circumferentially spaced around the axis of rotation on a first axial side of the drive coupler. The lugs are exposed on an exterior of the housing and unobstructed to receive rotational force at the first axial side of the drive coupler when the replaceable unit is installed in the image forming device. A pocket is formed in a second axial side of the drive coupler opposite the first axial side. The pocket includes a circular section at the axis of rotation of the drive coupler and a pair of elongated sections extending radially in opposite directions from the axis of rotation. The axial end of the shaft is positioned in the circular section of the pocket and the cross pin is positioned in the elongated sections of the pocket with the shaft substantially coaxial with the drive coupler such that upon rotating the drive coupler in an operative direction rotational force is transferred from surfaces of the drive coupler forming the pocket to the cross pin causing the shaft to rotate with the drive coupler. The pocket includes an open entrance from the second axial side of the drive coupler into the circular section and the elongated sections of the drive coupler.

A drive coupler according to one example embodiment includes an axis of rotation, a first axial side and a second axial side opposite the first axial side. The drive coupler includes a plurality of lugs circumferentially spaced around the axis of rotation on the first axial side of the drive coupler. The lugs are unobstructed to receive rotational force at the first axial side of the drive coupler. A pocket is formed in the second axial side of the drive coupler. The pocket includes a circular section at the axis of rotation of the drive coupler and a pair of elongated sections extending radially in opposite directions from the axis of rotation. The pocket includes an open entrance from the second axial side of the drive coupler into the circular section and the pair of elongated sections.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
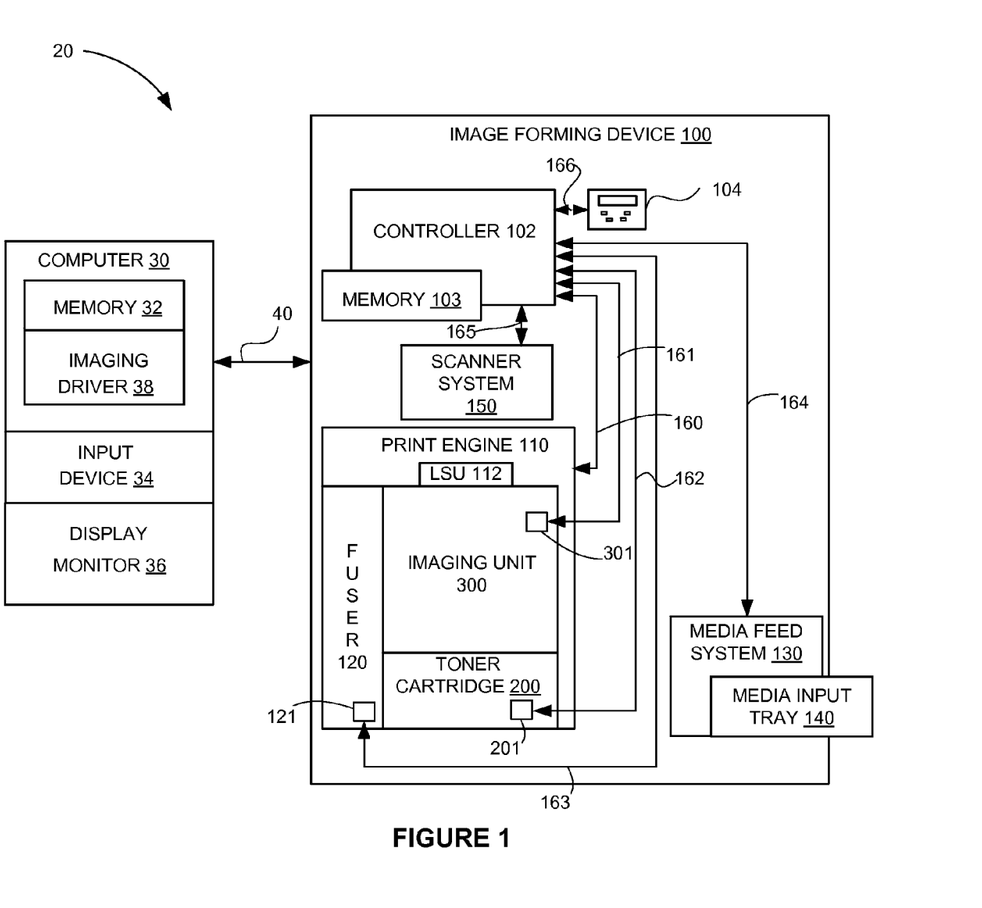
FIG. 1 is a block diagram depiction of an imaging system according to one example embodiment.

Referring now to the drawings and more particularly to FIG. 1, there is shown a block diagram depiction of an imaging system 20 according to one example embodiment. Imaging system 20 includes an image forming device 100 and a computer 30. Image forming device 100 communicates with computer 30 via a communications link 40. As used herein, the term "communications link" generally refers to any structure that facilitates electronic communication between multiple components and may operate using wired or wireless technology and may include communications over the Internet.

In the example embodiment shown in FIG. 1, image forming device 100 is a multifunction machine (sometimes referred to as an all-in-one (AIO) device) that includes a controller 102, a print engine 110, a laser scan unit (LSU) 112, one or more toner bottles or cartridges 200, one or more imaging units 300, a fuser 120, a user interface 104, a media feed system 130 and media input tray 140 and a scanner system 150. Image forming device 100 may communicate with computer 30 via a standard communication protocol, such as, for example, universal serial bus (USB), Ethernet or IEEE 802.xx. Image forming device 100 may be, for example, an electrophotographic printer/copier including an integrated scanner system 150 or a standalone electrophotographic printer.

Controller 102 includes a processor unit and associated memory 103 and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile RAM (NVRAM). Alternatively, memory 103 may be in the form of a separate electronic memory (e.g., RAM, ROM, and/or NVRAM), a hard drive, a CD or DVD drive, or any memory device convenient for use with controller 102. Controller 102 may be, for example, a combined printer and scanner controller.

In the example embodiment illustrated, controller 102 communicates with print engine 110 via a communications link 160. Controller 102 communicates with imaging unit(s) 300 and processing circuitry 301 on each imaging unit 300 via communications link(s) 161. Controller 102 communicates with toner cartridge(s) 200 and processing circuitry 201 on each toner cartridge 200 via communications link(s) 162. Controller 102 communicates with fuser 120 and processing circuitry 121 thereon via a communications link 163. Controller 102 communicates with media feed system 130 via a communications link 164. Controller 102 communicates with scanner system 150 via a communications link 165. User interface 104 is communicatively coupled to controller 102 via a communications link 166. Processing circuitry 121, 201, 301 may include a processor and associated memory such as RAM, ROM, and/or NVRAM and may provide authentication functions, safety and operational interlocks, operating parameters and usage information related to fuser 120, toner cartridge(s) 200 and imaging unit(s) 300, respectively. Controller 102 processes print and scan data and operates print engine 110 during printing and scanner system 150 during scanning.

Computer 30, which is optional, may be, for example, a personal computer, including memory 32, such as RAM, ROM, and/or NVRAM, an input device 34, such as a keyboard and/or a mouse, and a display monitor 36. Computer 30 also includes a processor, input/output (I/O) interfaces, and may include at least one mass data storage device, such as a hard drive, a CD-ROM and/or a DVD unit (not shown). Computer 30 may also be a device capable of communicating with image forming device 100 other than a personal computer such as, for example, a tablet computer, a smartphone, or other electronic device.

In the example embodiment illustrated, computer 30 includes in its memory a software program including program instructions that function as an imaging driver 38, e.g., printer/scanner driver software, for image forming device 100. Imaging driver 38 is in communication with controller 102 of image forming device 100 via communications link 40. Imaging driver 38 facilitates communication between image forming device 100 and computer 30. One aspect of imaging driver 38 may be, for example, to provide formatted print data to image forming device 100, and more particularly to print engine 110, to print an image. Another aspect of imaging driver 38 may be, for example, to facilitate the collection of scanned data from scanner system 150.

In some circumstances, it may be desirable to operate image forming device 100 in a standalone mode. In the standalone mode, image forming device 100 is capable of functioning without computer 30. Accordingly, all or a portion of imaging driver 38, or a similar driver, may be located in controller 102 of image forming device 100 so as to accommodate printing and/or scanning functionality when operating in the standalone mode.

Figure 2:
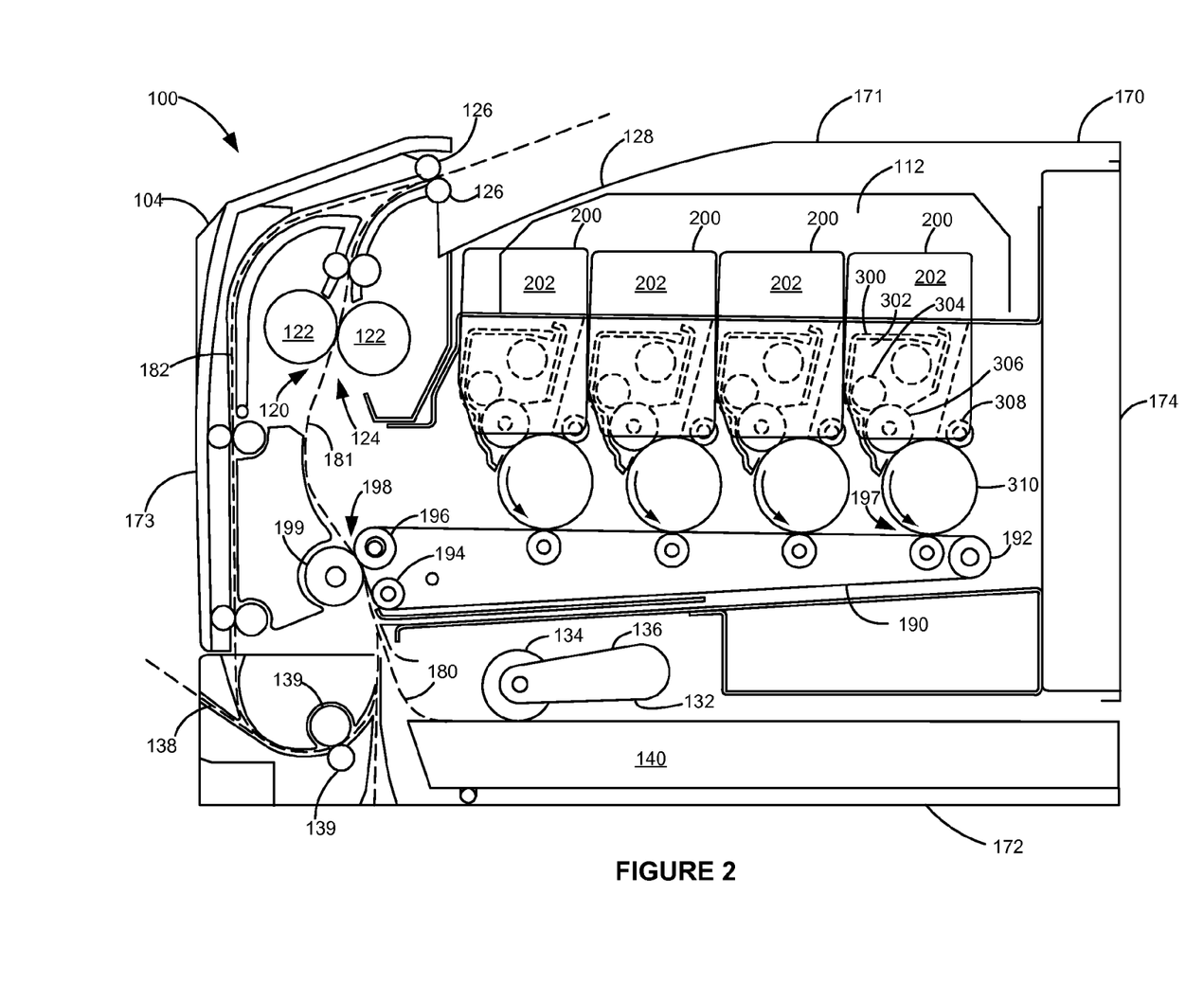
FIG. 2 is a schematic diagram of an image forming device according to a first example embodiment.

FIG. 2 illustrates a schematic view of the interior of an example image forming device 100. Image forming device 100 includes a housing 170 having a top 171, bottom 172, front 173 and rear 174. Housing 170 includes one or more media input trays 140 positioned therein. Trays 140 are sized to contain a stack of media sheets. As used herein, the term media is meant to encompass not only paper but also labels, envelopes, fabrics, photographic paper or any other desired substrate. Trays 140 are preferably removable for refilling. User interface 104 is shown positioned on housing 170. Using user interface 104, a user is able to enter commands and generally control the operation of the image forming device 100. For example, the user may enter commands to switch modes (e.g., color mode, monochrome mode), view the number of pages printed, etc. A media path 180 extends through image forming device 100 for moving the media sheets through the image transfer process. Media path 180 includes a simplex path 181 and may include a duplex path 182. A media sheet is introduced into simplex path 181 from tray 140 by a pick mechanism 132. In the example embodiment shown, pick mechanism 132 includes a roll 134 positioned at the end of a pivotable arm 136. Roll 134 rotates to move the media sheet from tray 140 and into media path 180. The media sheet is then moved along media path 180 by various transport rollers. Media sheets may also be introduced into media path 180 by a manual feed 138 having one or more rolls 139.

In the example embodiment shown, image forming device 100 includes four toner cartridges 200 removably mounted in housing 170 in a mating relationship with four corresponding imaging units 300 also removably mounted in housing 170. Each toner cartridge 200 includes a reservoir 202 for holding toner and an outlet port in communication with an inlet port of its corresponding imaging unit 300 for transferring toner from reservoir 202 to imaging unit 300. Toner is transferred periodically from a respective toner cartridge 200 to its corresponding imaging unit 300 in order to replenish the imaging unit 300. In the example embodiment illustrated, each toner cartridge 200 is substantially the same except for the color of toner contained therein. In one embodiment, the four toner cartridges 200 include black, cyan, yellow and magenta toner, respectively. In the example embodiment illustrated, each imaging unit 300 includes a toner reservoir 302 and a toner adder roll 304 that moves toner from reservoir 302 to a developer roll 306. Each imaging unit 300 also includes a charging roll 308 and a photoconductive (PC) drum 310. PC drums 310 are mounted substantially parallel to each other when the imaging units 300 are installed in image forming device 100. For purposes of clarity, the components of only one of the imaging units 300 are labeled in FIG. 2. In the example embodiment illustrated, each imaging unit 300 is substantially the same except for the color of toner contained therein.

Each charging roll 308 forms a nip with the corresponding PC drum 310. During a print operation, charging roll 308 charges the surface of PC drum 310 to a specified voltage such as, for example, −1000 volts. A laser beam from LSU 112 is then directed to the surface of PC drum 310 and selectively discharges those areas it contacts to form a latent image. In one embodiment, areas on PC drum 310 illuminated by the laser beam are discharged to approximately −300 volts. Developer roll 306, which forms a nip with the corresponding PC drum 310, then transfers toner to PC drum 310 to form a toner image on PC drum 310. A metering device such as a doctor blade assembly can be used to meter toner onto developer roll 306 and apply a desired charge on the toner prior to its transfer to PC drum 310. The toner is attracted to the areas of the surface of PC drum 310 discharged by the laser beam from LSU 112.

In the example embodiment illustrated, an intermediate transfer mechanism (ITM) 190 is disposed adjacent to the PC drums 310. In this embodiment, ITM 190 is formed as an endless belt trained about a drive roll 192, a tension roll 194 and a back-up roll 196. During image forming operations, ITM 190 moves past PC drums 310 in a clockwise direction as viewed in FIG. 2. One or more of PC drums 310 apply toner images in their respective colors to ITM 190 at a first transfer nip 197. In one embodiment, a positive voltage field attracts the toner image from PC drums 310 to the surface of the moving ITM 190. ITM 190 rotates and collects the one or more toner images from PC drums 310 and then conveys the toner images to a media sheet at a second transfer nip 198 formed between a transfer roll 199 and ITM 190, which is supported by back-up roll 196.

A media sheet advancing through simplex path 181 receives the toner image from ITM 190 as it moves through the second transfer nip 198. The media sheet with the toner image is then moved along the media path 180 and into fuser 120. Fuser 120 includes fusing rolls or belts 122 that form a nip 124 to adhere the toner image to the media sheet. The fused media sheet then passes through exit rolls 126 located downstream from fuser 120. Exit rolls 126 may be rotated in either forward or reverse directions. In a forward direction, exit rolls 126 move the media sheet from simplex path 181 to an output area 128 on top 171 of image forming device 100. In a reverse direction, exit rolls 126 move the media sheet into duplex path 182 for image formation on a second side of the media sheet.

Figure 3:
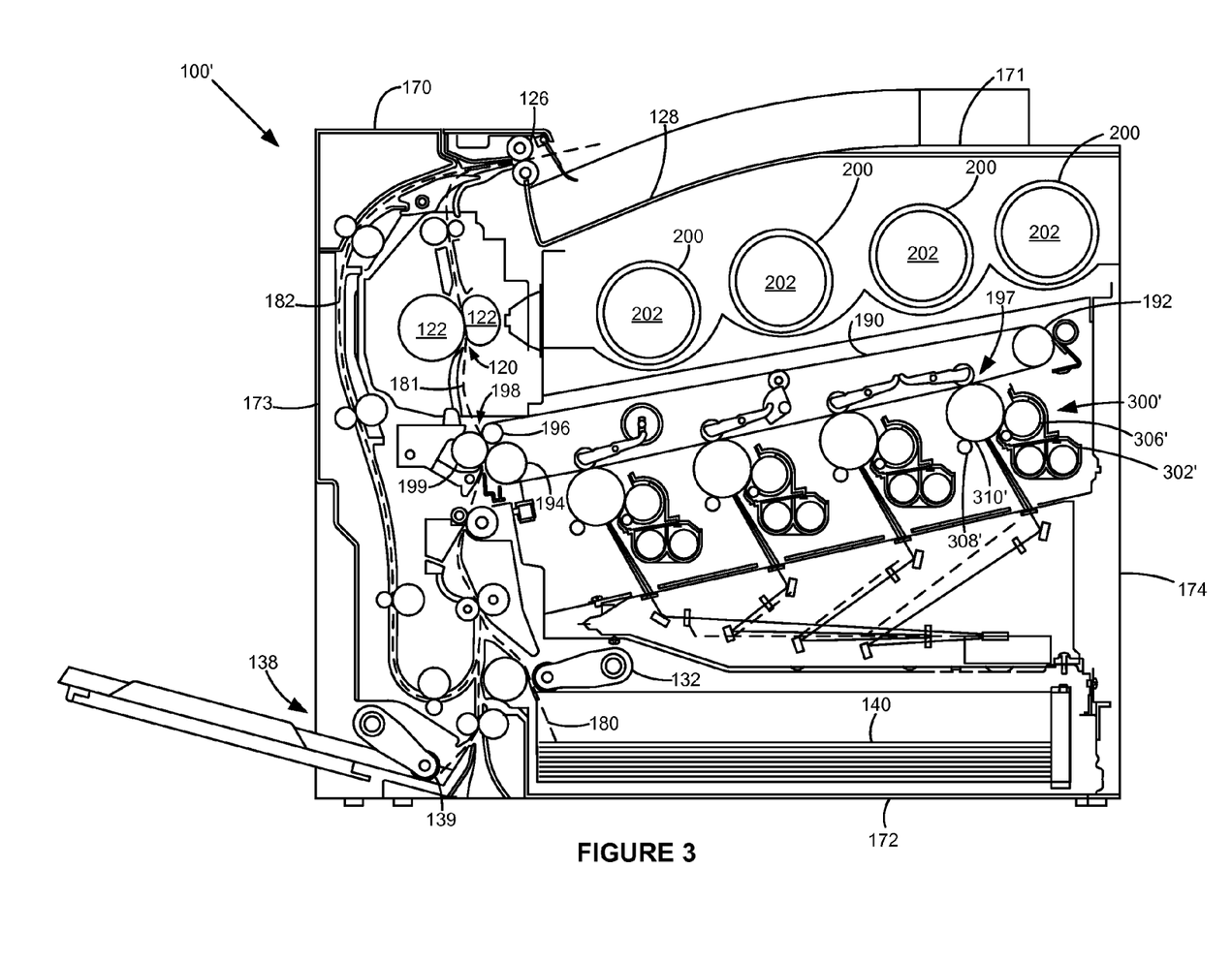
FIG. 3 is a schematic diagram of an image forming device according to a second example embodiment.

FIG. 3 illustrates an example embodiment of an image forming device 100' that utilizes what is commonly referred to as a dual component developer system. In this embodiment, image forming device 100' includes four toner cartridges 200 removably mounted in housing 170 and mated with four corresponding imaging units 300'. Toner is periodically transferred from reservoirs 202 of each toner cartridge 200 to corresponding reservoirs 302' of imaging units 300'. The toner in reservoirs 302' is mixed with magnetic carrier beads. The magnetic carrier beads may be coated with a polymeric film to provide triboelectric properties to attract toner to the carrier beads as the toner and the magnetic carrier beads are mixed in reservoir 302'. In this embodiment, each imaging unit 300' includes a magnetic roll 306' that attracts the magnetic carrier beads having toner thereon to magnetic roll 306' through the use of magnetic fields and transports the toner to the corresponding photoconductive drum 310' which is charged by a corresponding charge roll 308'. Electrostatic forces from the latent image on the photoconductive drum 310' strip the toner from the magnetic carrier beads to provide a toned image on the surface of the photoconductive drum 310'. The toned image is then transferred to ITM 190 at first transfer nip 197 as discussed above.

While the example image forming devices 100 and 100' shown in FIGS. 2 and 3 illustrate four toner cartridges 200 and four corresponding imaging units 300, 300', it will be appreciated that a monocolor image forming device 100 or 100' may include a single toner cartridge 200 and corresponding imaging unit 300 or 300' as compared to a color image forming device 100 or 100' that may include multiple toner cartridges 200 and imaging units 300, 300'. Further, although imaging forming devices 100 and 100' utilize ITM 190 to transfer toner to the media, toner may be applied directly to the media by the one or more photoconductive drums 310, 310' as is known in the art. In addition, toner may be transferred directly from each toner cartridge 200 to its corresponding imaging unit 300 or 300' or the toner may pass through an intermediate component such as a chute or duct that connects the toner cartridge 200 with its corresponding imaging unit 300 or 300'.

The configurations of toner cartridges 200 and imaging units 300, 300' shown in FIGS. 2 and 3 are meant to serve as examples and are not intended to be limiting. For instance, although the example image forming devices discussed above include a pair of mating replaceable units in the form of toner cartridge 200 and imaging unit 300 or 300', it will be appreciated that the replaceable unit(s) of the image forming device may employ any suitable configuration as desired. For example, in one embodiment, the main toner supply for the image forming device and the components of imaging unit 300 or 300' are housed in a single replaceable unit. In another embodiment, the main toner supply for the image forming device, toner adder roll 304 and developer roll 306 are provided in a first replaceable unit and photoconductive drum 310 and charging roll 308 are provided in a second replaceable unit. In another embodiment, toner adder roll 304 and developer roll 306 are provided in a first replaceable imaging unit and photoconductive drum 310 and charging roll 308 are provided in a second replaceable imaging unit. Similarly, in one embodiment, reservoir 302' and magnetic roll 306' are provided in a first replaceable imaging unit and charge roll 308' and photoconductive drum 310' are provided in a second replaceable imaging unit. One skilled in the art will appreciate that many other combinations and configurations of toner cartridges 200 and imaging units 300, 300' may be used as desired.

Figure 4:
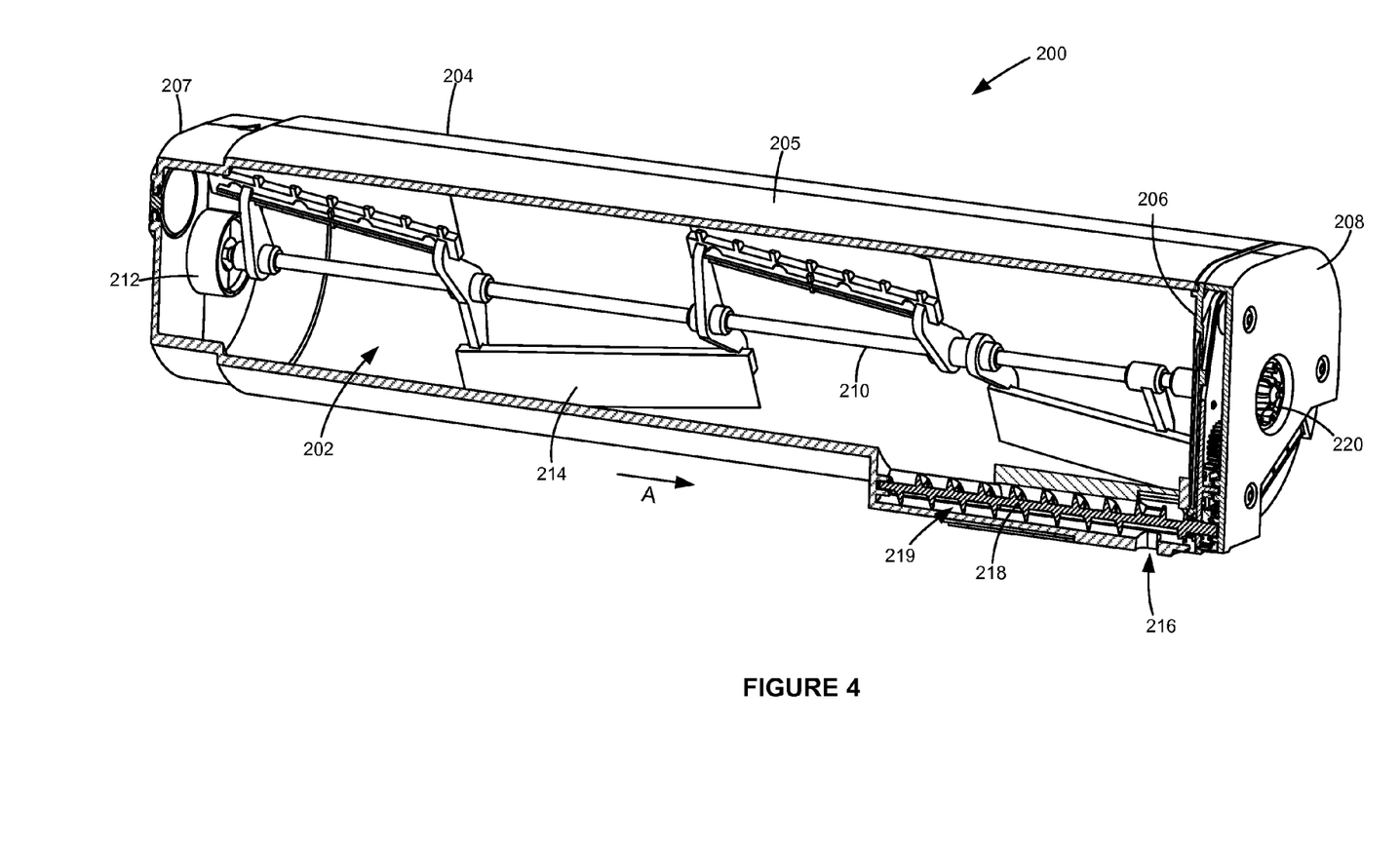
FIG. 4 is a perspective side view of a replaceable unit according to one example embodiment having a portion of a body of the replaceable unit removed to illustrate an internal toner reservoir.

With reference to FIG. 4, a replaceable unit in the form of a toner cartridge 200 is shown according to one example embodiment. Toner cartridge 200 includes a body 204 that includes walls forming toner reservoir 202. In the example embodiment illustrated, body 204 includes a generally cylindrical wall 205 and a pair of end walls 206, 207. In this embodiment, an end cap 208 is mounted on end wall 206, such as by suitable fasteners (e.g., screws, rivets, etc.) or by a snap-fit engagement. A similar end cap may also be mounted on end wall 207 as desired. FIG. 4 shows toner cartridge 200 with a portion of body 204 removed to illustrate the internal components of toner cartridge 200. A rotatable shaft 210 extends along the length of toner cartridge 200 within toner reservoir 202. As desired, the ends of rotatable shaft 210 may be received in bushings or bearings 212 positioned on an inner surface of end walls 206, 207. One or more agitators 214 (e.g., paddle(s), auger(s), etc.) are mounted on and rotate with shaft 210 to stir and move toner within reservoir 202 as desired. In one embodiment, shaft 210 has a relatively small diameter such as, for example, about 4 mm, in order to maximize the amount of space available in reservoir 202 for toner. In one embodiment, shaft 210 is composed of steel to handle high torque loads resulting from the resistance to the rotation of agitators 214 provided by toner in reservoir 202. This resistance is particularly high when toner cartridge 200 is unused for an extended period of time such as during shipping or storage which may cause the toner in reservoir 202 to pack. An outlet port 216 is positioned to exit toner from reservoir 202. In the example embodiment illustrated, outlet port 216 is positioned on a bottom portion of body 204 near end wall 206; however, outlet port 216 may be positioned in any suitable position. In the embodiment illustrated, an auger 218 is positioned in a channel 219 that is open at one end to reservoir 202 and at the other end to outlet port 216. As shaft 210 rotates, agitators 214 push toner into channel 219 where auger 218 conveys the toner to outlet port 216 to exit the toner from toner cartridge 200. As desired, outlet port 216 may include a shutter or a cover (such as sliding shutter 217 shown in FIGS. 5 and 6) that is movable between a closed position blocking outlet port 216 to prevent toner from flowing out of toner cartridge 200 and an open position permitting toner flow.

A drive coupler 220 is positioned on an exterior portion of body 204. In the example embodiment illustrated, toner cartridge 200 is inserted into the image forming device along lengthwise direction A shown in FIG. 4. In this embodiment, drive coupler 220 is mounted between an outer surface of end wall 206 and an inner surface of end cap 208 on a leading portion of toner cartridge 200 as toner cartridge 200 is inserted into the image forming device. When toner cartridge 200 is installed in the image forming device, drive coupler 220 receives rotational force from a corresponding drive coupler in the image forming device to rotate shaft 210 and auger 218. In one embodiment, drive coupler 220 is composed of molded plastic.

Figure 5:
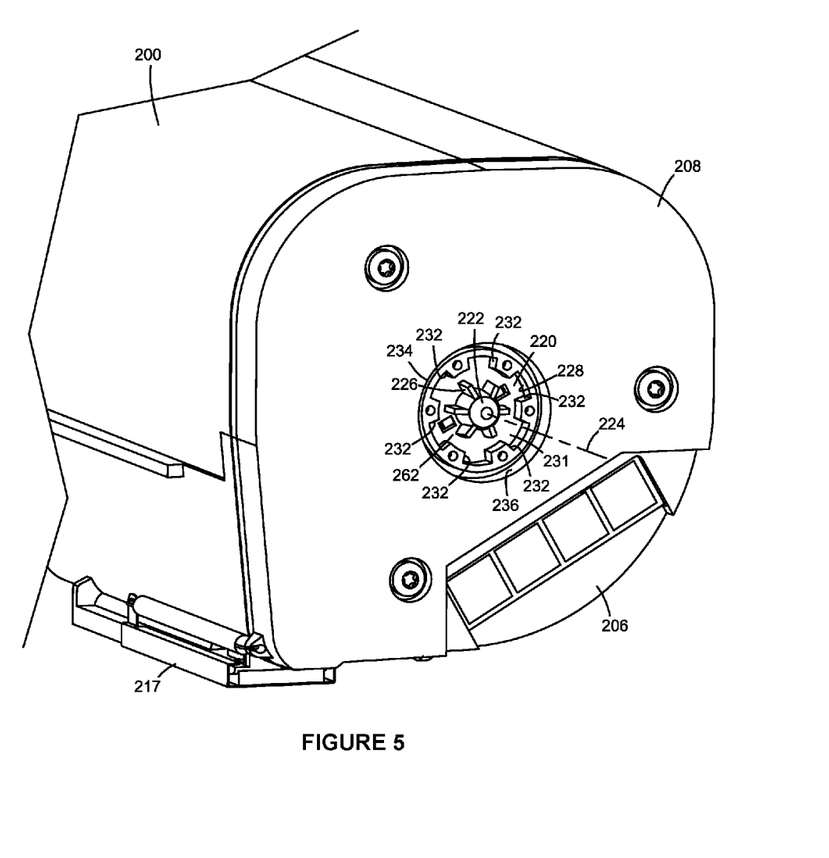
FIG. 5 is a perspective view of the replaceable unit shown in FIG. 4 showing a drive coupler according to one example embodiment.

FIG. 5 is a perspective view of toner cartridge 200 showing drive coupler 220 in greater detail according to one example embodiment. In the embodiment shown, drive coupler 220 includes a hub 222 positioned on an axis of rotation 224 of drive coupler 220. Hub 222 may include spokes 226 extending radially therefrom. In some embodiments, a height of hub 222 in the axial direction decreases from a peak at an outer axial edge at axis of rotation 224 to the outer radial portions of hub 222. For example, in one embodiment, hub 222 is shaped like a rounded cone or dome having a peak at axis of rotation 224 and tapering in height in the axial direction toward the outer radial portions of hub 222. Similarly, in some embodiments, a height of each spoke 226 decreases as the spoke 226 extends radially outward from axis of rotation 224.

Lugs 232 extend axially outward from an axial end surface 231 of an outer axial side 262 of drive coupler 220. Lugs 232 are spaced circumferentially from each other around axis of rotation 224. Lugs 232 are spaced substantially equally from each other around axis of rotation 224. Lugs 232 form the driving surfaces of drive coupler 220 that contact and receive the rotational force from the corresponding drive coupler in the image forming device as discussed in greater detail below. The example embodiment shown in FIG. 5 includes six lugs 232; however, more or fewer than six lugs 232 may be used as desired. For example, in another embodiment, drive coupler 220 includes three lugs 232 so that drive coupler 220 is self centering. Six lugs 232 may be used instead of three in order to permit drive coupler 220 to receive high torque loads since the torque is distributed to six lugs 232 instead of three. If lugs 232 are positioned slightly asymmetrically due to variations in the tooling used to create drive coupler 220, where drive coupler 220 is composed of plastic, the plastic material tends to flex so that each of the six lugs 232 receives a share of the torque load. In the example embodiment illustrated, in operation, drive coupler 220 turns in a clockwise direction as viewed in FIG. 5.

End cap 208 includes an opening 234 therethrough where drive coupler 220 is positioned that exposes hub 222, spokes 226 and lugs 232 of drive coupler 220 at the axial end of drive coupler 220. In one embodiment, drive coupler 220 is recessed in opening 234 relative to the outer surface of end cap 208 with only the outer axial end of hub 222 extending past the outer surface of end cap 208. The recessed position of drive coupler 220 makes it difficult for a user to manually rotate drive coupler 220 when toner cartridge 200 is outside of the image forming device which could cause toner to pack near outlet port 216 if a shutter or cover at outlet port is closed resulting in a high toner dump when the shutter or cover is opened. Alternatively, if no shutter or cover is present, manual rotation of drive coupler 220 outside of the image forming device may force toner through outlet port 216 onto the user. End cap 208 includes a collar 236 formed around the perimeter of opening 234 that extends axially inward from end cap 208 to restrain drive coupler 220 from moving axially outward as discussed in greater detail below. Drive coupler 220 is relatively narrow in the axial direction such as, for example, about 3 mm in the axial direction, in order to maximize the amount of the axial length of toner cartridge 200 available for reservoir 202 in order to maximize the amount of toner stored in toner cartridge 200.

A circumferential ring 228 may be positioned around hub 222 and spokes 226. In the example embodiment illustrated, ring 228 substantially encircles hub 222 and spokes 226. Lugs 232 extend radially inward from ring 228. Ring 228 provides structural support to lugs 232. Ring 228 is sized to fit within collar 236 of end cap 208 in opening 234.

Shaft 210 is connected directly to drive coupler 220 as discussed in greater detail below. Shaft 210 extends axially inward from drive coupler 220 coaxially with drive coupler 220 such that rotational force is transferred directly to shaft 210 by drive coupler 220.

Figure 6:
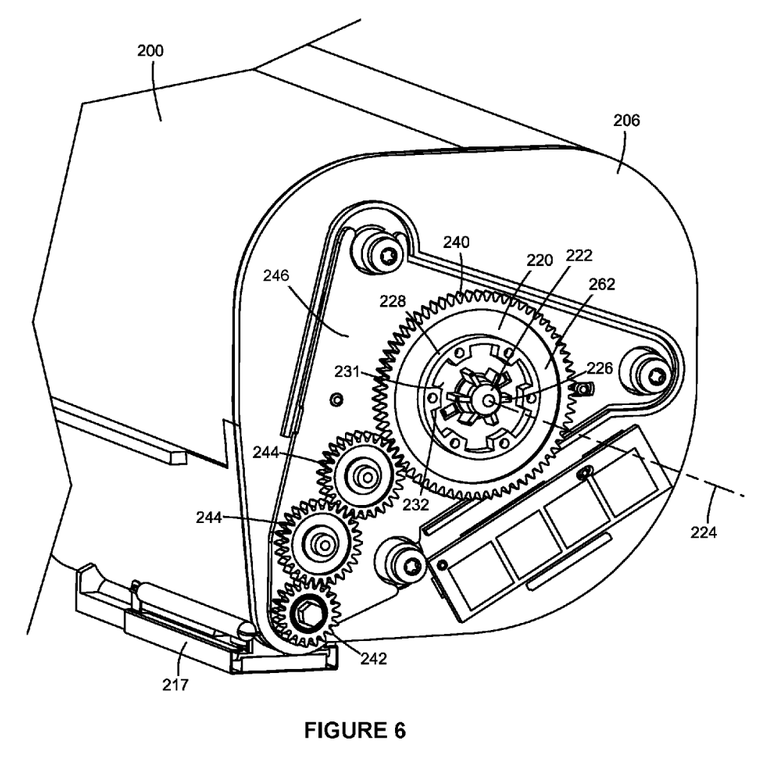
FIG. 6 is a perspective view of the replaceable unit shown in FIG. 5 with an end cap removed.

FIG. 6 shows toner cartridge 200 with end cap 208 removed to illustrate the components positioned between end cap 208 and an outer surface of end wall 206. Drive coupler 220 may include gear teeth 240 on an outer radial portion thereof as shown in the embodiment illustrated. Gear teeth 240 transfer rotational force to one or more additional gears positioned on end wall 206. For example, in the embodiment illustrated, a driven gear 242 is connected (directly or indirectly) to drive coupler 220. Driven gear 242 is operatively connected to a shaft of auger 218 to transfer rotational force received by drive coupler 220 to auger 218 such that the rotational force received by drive coupler 220 rotates both shaft 210 and auger 218. In the example embodiment illustrated, driven gear 242 is connected to drive coupler 220 by one or more idler gears 244. Alternatively, driven gear 242 may mesh directly with gear teeth 240 depending on the placement of auger 218 relative to shaft 210. The gear ratio between drive coupler 220 and driven gear 242 may be selected to achieve a desired toner flow rate from reservoir 202. For example, in one embodiment, the gear ratio between gear teeth 240 and drive gear 242 is about 3:1 (i.e., for every rotation of shaft 210, auger 218 rotates about three times). In this embodiment, if paddles 214 push toner into channel 219 once per revolution of shaft 210, at least three flutes of auger 218 are positioned at the end of channel 219 that is open to reservoir 202 to ensure that auger 218 is properly filled with toner to provide a more consistent flow rate of toner from toner cartridge 200. As shown in FIG. 6, a bearing plate 246 may be positioned on the outer surface of end wall 206 to locate and provide a bearing surface for drive coupler 220, drive gear 242 and idler gears 244.

Figure 7:
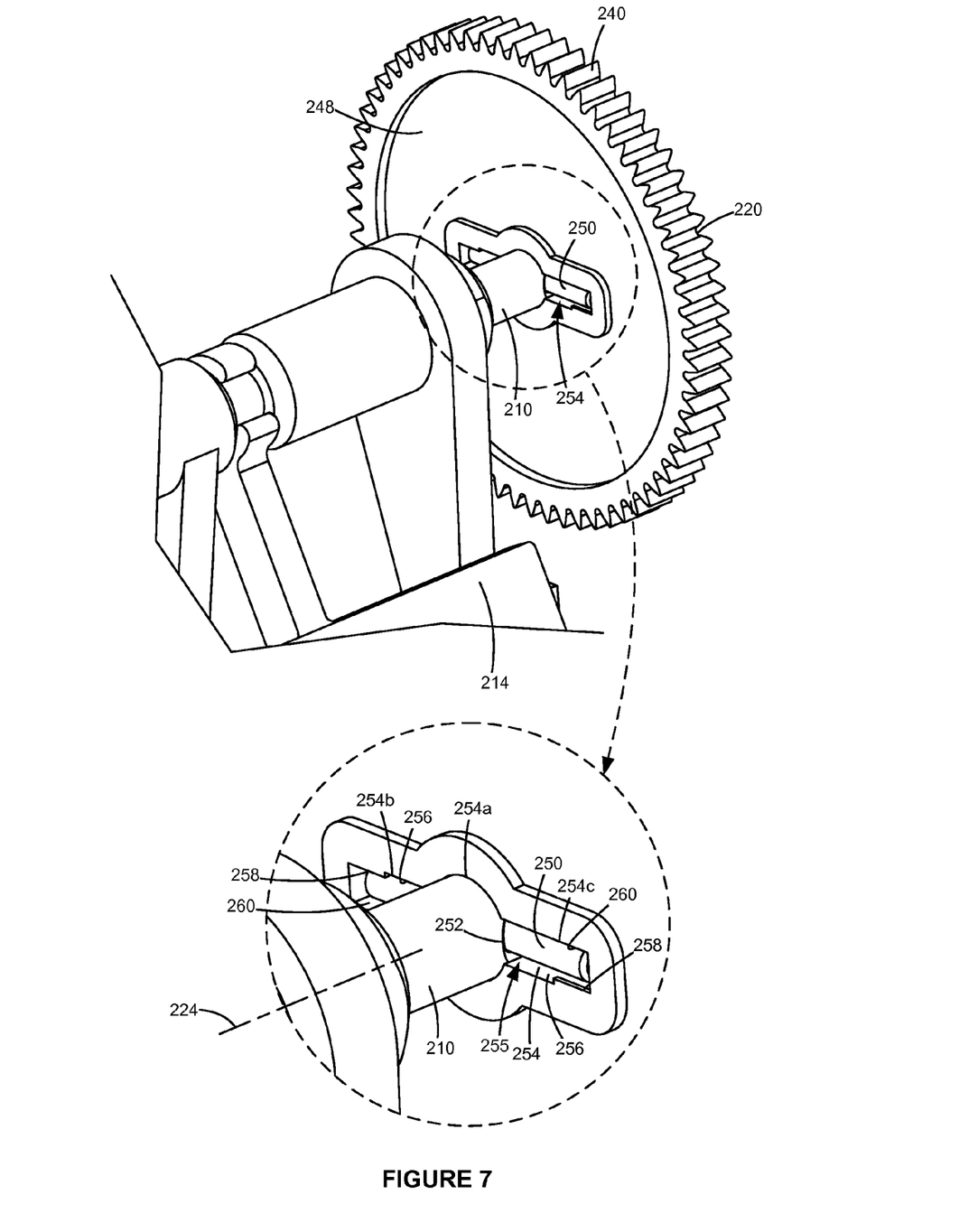
FIG. 7 is a rear perspective view of the drive coupler engaged with a shaft according to one example embodiment.

FIG. 7 shows an inner axial side 248 of drive coupler 220 that is positioned against the outer surface of end wall 206 with body 204 of toner cartridge 200 removed to illustrate the engagement between drive coupler 220 and shaft 210 according to one embodiment. The axial end of shaft 210 extends through an opening in end wall 206 and an opening in bearing plate 246 and connects to inner axial side 248 of drive coupler 220. A cross pin 250 is positioned through a cylindrical hole 252 through the end of shaft 210 substantially perpendicular to axis of rotation 224. In one embodiment, cross pin 250 has a relatively small diameter such as, for example, about 1.5 mm. In one embodiment, cross pin 250 is composed of steel to handle high torque loads. A recess or pocket 254 is formed in inner axial side 248 of drive coupler 220. Pocket 254 receives cross pin 250 and the axial end of drive shaft 210. Specifically, pocket 254 includes a circular section 254a at its center that receives the axial end of shaft 210 and a pair of elongated sections 254b, 254c that extend radially in opposite directions from the center of circular section 254a and receive cross pin 250.

Shaft 210 and cross pin 250 are closely received by pocket 254 in order to ensure that shaft 210 and cross pin 250 do not slip relative to drive coupler 220 or disengage from drive coupler 220 so that rotational motion is transferred efficiently from drive coupler 220 to shaft 210. Specifically, cross pin 250 is constrained in its lengthwise dimension by the length of pocket 254. The diameter of cross pin 250 is constrained by the width and depth of elongated sections 254b, 254c of pocket 254. In operation, drive coupler 220 rotates in a counterclockwise direction as viewed in FIG. 7. As a result, during rotation of drive coupler 220, trailing surfaces 256 of elongated sections 254b, 254c of pocket 254 contact and push cross pin 250 in the operative rotational direction causing shaft 210 to rotate with drive coupler 220. In one embodiment, restraint lips 258 are formed on trailing surfaces 256 at an open entrance 255 into pocket 254. Specifically, restraint lips 258 extend in the direction of rotation of drive coupler 220 from trailing surface 256 and radially inward from the ends of elongated sections 254b, 254c of pocket 254 at the inner axial edge of pocket 254. Open entrance 255, like pocket 254, includes a circular section at axis of rotation 224 and a pair of elongated sections that extend radially in opposite directions from the center of the circular section. During rotation of drive coupler 220, trailing surfaces 256 of pocket 254 and restraint lips 258 grip cross pin 250 to prevent drive coupler 220 from separating from shaft 210. In this embodiment, corresponding restraint lips are not provided on leading surfaces 260 of elongated sections 254b, 254c of pocket 254 so that cross pin 250 can easily be inserted into pocket 254.

With reference back to FIGS. 5 and 6, when drive coupler 220 is not rotating, the engagement between collar 236 and outer axial side 262 of drive coupler 220 outside of ring 238 prevents drive coupler 220 from traveling too far axially outward for cross pin 250 to disengage from pocket 254. Specifically, the engagement between collar 236 and outer axial side 262 prevents drive coupler 220 from traveling far enough axially outward for one-half or more of the diameter of cross pin 250 to pass restraint lips 258 through open entrance 255. As a result, from a manufacturing standpoint, the assembly of drive coupler 220 onto shaft 210 is relatively easy. Cross pin 250 is inserted through hole 252 in shaft 210 and then the axial end of shaft 210 and cross pin 250 are inserted through open entrance 255 into pocket 254 on inner axial side 248 of drive coupler 220. Despite this relatively simple attachment method, drive coupler 220 is securely attached to shaft 210 so that rotational motion transfers properly from drive coupler 220 to shaft 210 and so that drive coupler 220 does not separate from shaft 210 during operation. Similarly, to disassemble drive coupler 220 from shaft 210, the user removes end cap 208 freeing drive coupler 220 to move axially away from shaft 210 and the user simply pulls the axial end of shaft 210 and cross pin 250 through open entrance 255 out of pocket 254.

The engagement between cross pin 250 and pocket 254 on inner axial side 248 of drive coupler 220 permits the use of a plastic drive coupler 220 to transfer high torque loads from drive coupler 220 to shaft 210. Common methods for connecting a shaft to a drive coupler or gear such as knurls, D-slots, hex holes and square holes create stresses which may cause the plastic material of drive coupler 220 to deform thereby disrupting the transmission of rotational force between drive coupler 220 and shaft 210. In contrast, the force from cross pin 250 on inner axial side 248 of drive coupler 220 is spaced an adequate distance from axis of rotation 224 so as not to create excessive stress on the plastic material of drive coupler 220. It will be appreciated that the use of a plastic drive coupler 220 is preferred to metal due to the relative manufacturing costs.

Figure 8A:
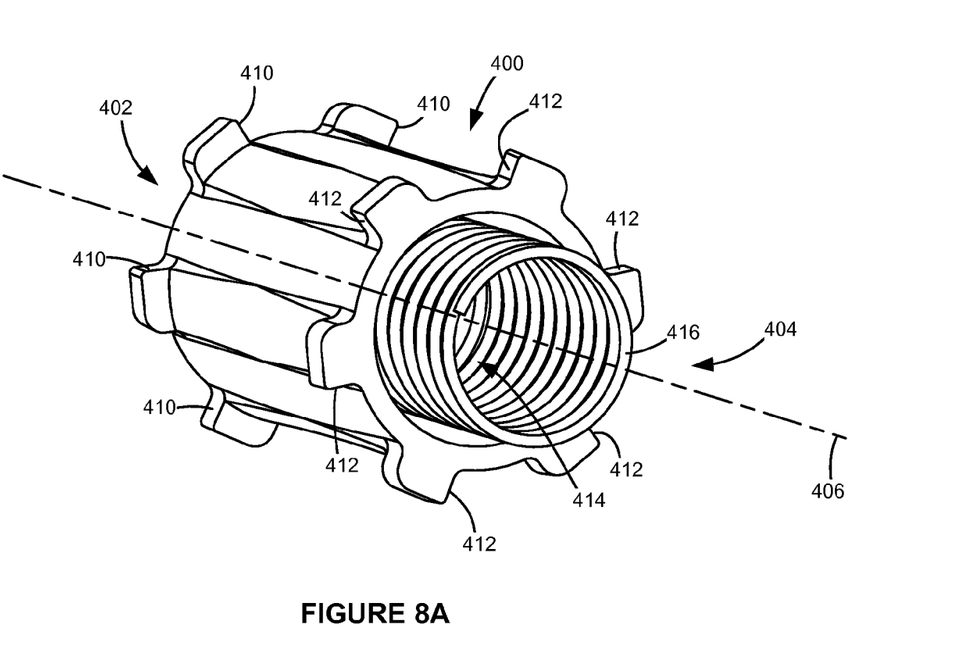
FIGS. 8A and 8B are rear and front perspective views of a corresponding drive coupler of the image forming device according to one example embodiment.
Figure 8B:
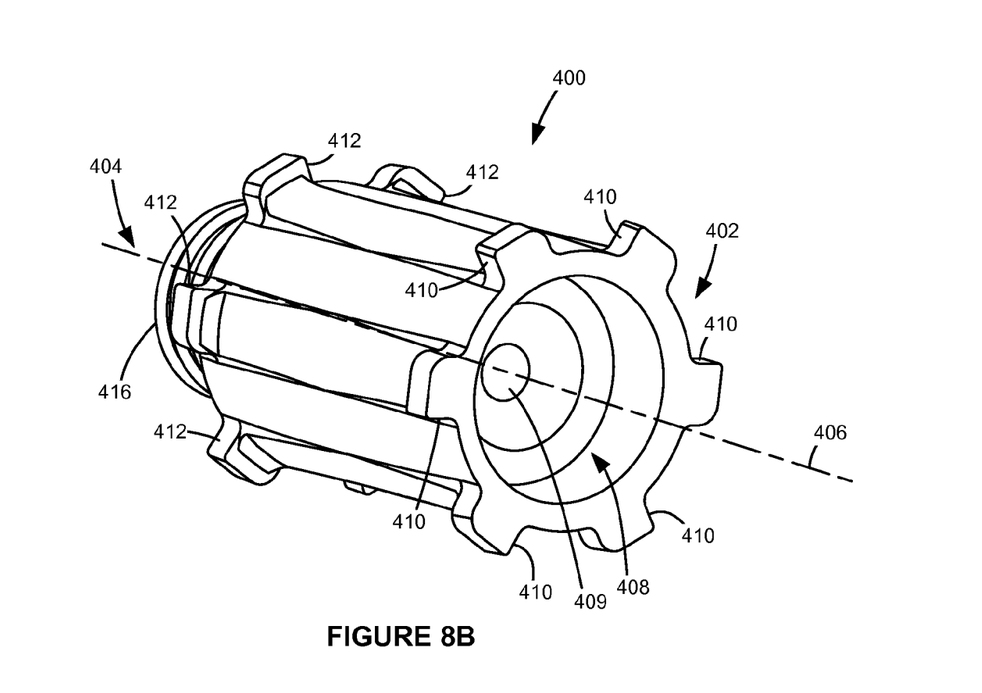

FIGS. 8A and 8B show a drive coupler 400 of the image forming device according to one example embodiment. In the example embodiment illustrated, a front end 402 of drive coupler 400 mates with drive coupler 220 of the replaceable unit and a rear end 404 of drive coupler 400 is operatively connected through a gear train to a drive motor in the image forming device. Drive coupler 400 includes an axis of rotation 406. Front end 402 of drive coupler 400 includes a recessed cavity 408 large enough to receive hub 222 and spokes 226 of drive coupler 220 therein. An engagement surface 409 of cavity 408 at axis of rotation 406 engages hub 222 of drive coupler 220 in operation as discussed in greater detail below. In one embodiment, engagement surface 409 is substantially planar and orthogonal to axis of rotation 406. Drive coupler 400 also includes one or more drive elements on front end 402 such as, for example, lugs 410 extending radially outward therefrom and positioned to contact lugs 232 of drive coupler 220. In another embodiment, lugs 410 extend axially outward from front end 402 of drive coupler 400. Generally, the number of lugs 410 of drive coupler 400 corresponds with the number of lugs 232 of drive coupler 220; however, drive coupler 400 may include more or less lugs 410 than the number of lugs 232 of drive coupler 220 as desired depending on the spacing between lugs 232 and the spacing between lugs 410. In the example embodiment illustrated, drive coupler 400 includes six lugs 410 corresponding to six lugs 232. Drive coupler 400 also includes one or more drive elements on rear end 404 such as, for example, lugs 412 extending radially outward therefrom. Lugs 412 receive rotational force from a corresponding gear that is operatively connected to the drive motor in the image forming device. Rear end 404 of drive coupler 400 also includes an open cavity 414 formed therein. Cavity 414 receives a biasing device such as, for example, a compression spring 416 that biases drive coupler 400 in the direction of drive coupler 220 and toner cartridge 200.

Figure 9:
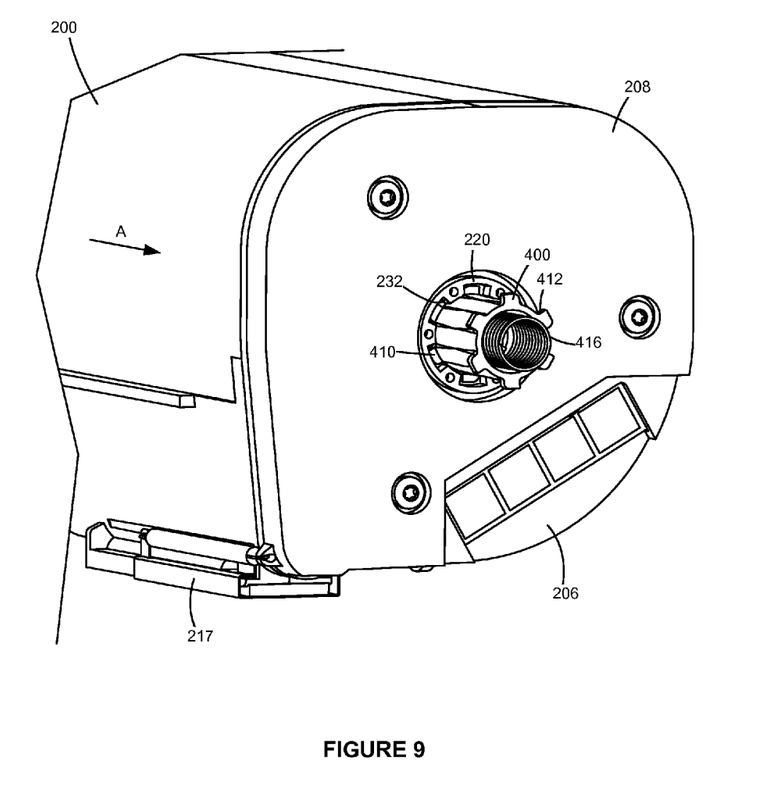
FIG. 9 is a perspective view of the drive coupler of the replaceable unit engaged with the corresponding drive coupler of the image forming device.

FIG. 9 shows the replaceable unit fully inserted into the image forming device with drive coupler 220 engaged with drive coupler 400. Drive coupler 400 is biased toward drive coupler 220 in order to ensure reliable contact between the two to permit the transfer of rotational force from drive coupler 400 to drive coupler 220. For example, in the embodiment illustrated, compression spring 416 biases drive coupler 400 toward drive coupler 220. Drive coupler 400 is movable axially to a certain degree and can tilt axis of rotation 406 relative to axis of rotation 224 of drive coupler 220 to a certain degree to allow for misalignment between drive coupler 220 and drive coupler 400. For example, in one embodiment, drive coupler 400 can accommodate at least 2 mm of radial offset in any direction between the center of drive coupler 220 and the center of rear end 404 of drive coupler 400. In operation, as the replaceable unit is inserted into the image forming device along insertion direction A, when drive coupler 220 nears drive coupler 400, hub 222 enters cavity 408. If drive coupler 220 and drive coupler 400 are misaligned, the tapered shape of hub 222 urges drive coupler 400 into alignment with drive coupler 220 as hub 222 contacts drive coupler 400. In the final operating position of toner cartridge 200, the axial outermost tip of hub 222 contacts surface 409 of drive coupler 400 thereby establishing the axial position of drive coupler 400 relative to drive coupler 220. The bias applied to drive coupler 400 maintains the contact between surface 409 and hub 222. The flat shape of surface 409 against the rounded shape of hub 222 allows axis of rotation 406 of drive coupler 400 to tilt relative to axis of rotation 224 of drive coupler 220 so that hub 222 can contact surface 409 even if drive coupler 220 and drive coupler 400 are initially misaligned upon insertion of toner cartridge 200. As hub 222 comes into contact with surface 409, lugs 410 of drive coupler 400 align between lugs 232 of drive coupler 220. Upon rotating drive coupler 400 in the operative direction (clockwise as viewed in FIG. 9), lugs 410 contact and push lugs 232 thereby causing drive coupler 220 to rotate with drive coupler 400. If during the insertion of toner cartridge 200 into the image forming device lugs 410 land on an outer axial surface of lugs 232, hub 222 may tend to urge lugs 410 to a position between lugs 232 of drive coupler 220 as hub 222 engages surface 409. Otherwise, upon rotating drive coupler 400, lugs 410 will slide along the axial outer surface of lugs 232 in the rotational direction of drive coupler 400 until lugs 410 advance axially into the spaces between lugs 232 as a result of the bias applied to drive coupler 400. Hub 222 and surface 409 are sized to prevent lugs 410 from contacting axial end surface 231 of drive coupler 220 which could restrict the ability of axis of rotation 406 of drive coupler 400 to tilt relative to axis of rotation 224 of drive coupler 220. As a result, in one embodiment, in the final operating position of toner cartridge 200, the only contact points between drive coupler 400 and drive coupler 220 are the contact between lugs 410 and lugs 232 and the contact between surface 409 and hub 222.

While the example embodiment shown in FIGS. 5-9 includes drive coupler 220 positioned on a toner cartridge 200, it will be appreciated that drive coupler 220 may be provided on any replaceable unit of the image forming device such as, for example, one or more of imaging unit(s) 300 or 300' or fuser 120. Similarly, drive coupler 220 may be used in an application other than an electrophotographic image forming device where it is desired to transfer rotational force to a replaceable unit. Further, while the example embodiments discussed above illustrate a drive coupler that receives rotational motion at its axial end, it will be appreciated that drive coupler 220 having pocket 254 sized to receive the axial end of shaft 210 and cross pin 250 may instead receive rotational motion at gear teeth 240.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A replaceable unit for an image forming device, comprising:
   a housing having a reservoir for storing toner;
   a rotatable shaft having a cross pin on an axial end of the shaft, the cross pin is positioned generally orthogonal to the shaft;
   a rotatable drive coupler having an axis of rotation, at least a portion of the drive coupler is exposed on an exterior of the housing and unobstructed to receive rotational force when the replaceable unit is installed in the image forming device; and
   a pocket formed in a first axial side of the drive coupler, the axial end of the shaft and the cross pin are removably positioned in the pocket such that upon rotating the drive coupler in an operative direction rotational force is transferred from surfaces of the drive coupler forming the pocket to the cross pin causing the shaft to rotate with the drive coupler, wherein the pocket includes a circular section at the axis of rotation of the drive coupler and a pair of elongated sections extending radially in opposite directions from the axis of rotation, the circular section and the pair of elongated sections of the pocket are formed by a unitary opening that extends in an axial direction of the drive coupler into a face of the second axial side of the drive coupler, the axial end of the shaft is positioned in the circular section of the pocket and the cross pin is positioned in the elongated sections of the pocket with the shaft substantially coaxial with the drive coupler, the pocket includes an open entrance from the first axial side of the drive coupler into the circular section and the elongated sections of the drive coupler, wherein a drive surface of the drive coupler is positioned to receive rotational force at a second axial side of the drive coupler opposite the first axial side when the replaceable unit is installed in the image forming device and the drive surface is recessed axially inward from an outer surface of the housing and exposed through an opening in the outer surface of the housing.

2. The replaceable unit of claim 1, further comprising a collar extending axially inward from the outer surface of the housing around the opening in the outer surface of the housing, the collar is positioned to restrain axial outward movement of the drive coupler.

3. The replaceable unit of claim 1, wherein the cross pin is constrained in a lengthwise dimension of the cross pin by a length of the elongated sections of the pocket.

4. The replaceable unit of claim 1, wherein a restraint lip extends in the operative direction of rotation from a trailing surface of each elongated section in the pocket relative to the operative direction of rotation, each restraint lip extends part way across the open entrance to the pocket.

5. A replaceable unit for an image forming device, comprising:

a housing having a reservoir for storing toner;

a rotatable shaft having a cross pin on an axial end of the shaft, the cross pin is positioned generally orthogonal to the shaft;

a rotatable drive coupler having an axis of rotation, the drive coupler has a plurality of lugs circumferentially spaced around the axis of rotation on a first axial side of the drive coupler, the lugs are exposed on an exterior of the housing and unobstructed to receive rotational force at the first axial side of the drive coupler when the replaceable unit is installed in the image forming device; and a pocket formed in a second axial side of the drive coupler opposite the first axial side, the pocket includes a circular section at the axis of rotation of the drive coupler and a pair of elongated sections extending radially in opposite directions from the axis of rotation, the circular section and the pair of elongated sections of the pocket are formed by a unitary opening that extends in an axial direction of the drive coupler into a face of the second axial side of the drive coupler, the axial end of the shaft is positioned in the circular section of the pocket and the cross pin is positioned in the elongated sections of the pocket with the shaft substantially coaxial with the drive coupler such that upon rotating the drive coupler in an operative direction rotational force is transferred from surfaces of the drive coupler forming the pocket to the cross pin causing the shaft to rotate with the drive coupler, the pocket includes an open entrance from the second axial side of the drive coupler into the circular section and the elongated sections of the drive coupler.

6. The replaceable unit of claim 5, wherein the plurality of lugs includes six lugs substantially equally spaced around the axis of rotation.

7. The replaceable unit of claim 5, wherein the plurality of lugs are recessed axially inward from an outer surface of the housing and exposed through an opening in the outer surface of the housing.

8. The replaceable unit of claim 7, wherein the drive coupler includes a hub on the first axial side of the drive coupler positioned at the axis of rotation and an outer axial tip of the hub extends past the outer surface of the housing.

9. The replaceable unit of claim 7, further comprising a collar extending axially inward from the outer surface of the housing around the opening in the outer surface of the housing radially outward from the plurality of lugs, the collar is positioned to restrain axial outward movement of the drive coupler.

10. The replaceable unit of claim 5, wherein the cross pin is constrained in a lengthwise dimension of the cross pin by a length of the elongated sections of the pocket.

11. The replaceable unit of claim 5, wherein a restraint lip extends in the operative direction of rotation transverse to the axial direction of the drive coupler from a trailing surface of each elongated section in the pocket relative to the operative direction of rotation, each restraint lip extends part way across the open entrance to the pocket.

\* \* \* \* \*

UNITED STATES PATENT AND TRADEMARK OFFICE
CERTIFICATE OF CORRECTION

Page 1 of 1

PATENT NO. : 9,829,855 B2
APPLICATION NO. : 14/285004
DATED : November 28, 2017
INVENTOR(S) : Michael Craig Leemhuis et al.

It is certified that error appears in the above-identified patent and that said Letters Patent is hereby corrected as shown below:

Claim 1, Column 13, Lines 11-12, the phrase "the second axial side of the drive coupler" should read --a second axial side of the drive coupler opposite the first axial side--.

Claim 1, Column 13, Lines 20-21, the phrase "a second axial side of the drive coupler opposite the first axial side" should read --the second axial side of the drive coupler--.

Signed and Sealed this
Sixth Day of August, 2019

Andrei Iancu
*Director of the United States Patent and Trademark Office*